(12) United States Patent
Dannhauer et al.

(10) Patent No.: US 7,798,007 B2
(45) Date of Patent: Sep. 21, 2010

(54) HYDRAULIC PRESSURE INTERMEDIARY

(75) Inventors: Wolfgang Dannhauer, Sandersdorf (DE); Ralf Nürnberger, Potsdam (DE); Anh Tuan Tham, Berlin (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 11/921,567

(22) PCT Filed: May 10, 2006

(86) PCT No.: PCT/EP2006/062200

§ 371 (c)(1),
(2), (4) Date: Jul. 13, 2009

(87) PCT Pub. No.: WO2006/131434

PCT Pub. Date: Dec. 14, 2006

(65) Prior Publication Data

US 2009/0301209 A1    Dec. 10, 2009

(30) Foreign Application Priority Data

Jun. 10, 2005   (DE) .................. 10 2005 027 035

(51) Int. Cl.
*G01L 7/08* (2006.01)
(52) U.S. Cl. .................... 73/715; 361/283.4
(58) Field of Classification Search .......... None
See application file for complete search history.

(56) References Cited

U.S. PATENT DOCUMENTS

| | | | |
|---|---|---|---|
| 3,869,906 A | * | 3/1975 | Andersson ............ 73/862.632 |
| 4,458,537 A | | 7/1984 | Bell |
| 4,924,701 A | | 5/1990 | Delatorre |
| 5,029,478 A | | 7/1991 | Wamstad |

(Continued)

FOREIGN PATENT DOCUMENTS

DE    199 46 234 C1    1/2001

(Continued)

*Primary Examiner*—Lisa M Caputo
*Assistant Examiner*—Jermaine Jenkins
(74) *Attorney, Agent, or Firm*—Bacon & Thomas, PLLC

(57) ABSTRACT

A hydraulic pressure intermediary includes: a platform, which has a bowl-shaped surface having an annular, platform-surface edge region, a platform-surface central region depressed relative to the platform-surface edge region and surrounded by the platform-surface edge region, and an annular platform-surface transition region, which borders, on its inner side, the platform-surface central region and, on its outer side, the platform-surface edge region; a bowl-shaped, separating membrane having a flat, annular, separating-membrane edge region, a separating-membrane central region depressed relative to the separating-membrane edge region and an annular separating-membrane transition region, which borders, on its inner side, the separating-membrane central region and, on its outer side, the separating-membrane edge region. The separating membrane is connected with the platform-surface edge region within the separating-membrane edge region along a surrounding joint. Further, the separating-membrane transition region includes an annular moat having a moat outer side, a moat inner side, and a moat transition zone, wherein the moat outer side has a first annular inclined surface, which borders on the separating-membrane edge region, the moat inner side includes a second annular inclined surface, which borders on the separating-membrane central region, and the moat transition zone extends between the first and the second inclined surfaces.

21 Claims, 1 Drawing Sheet

U.S. PATENT DOCUMENTS

| | | | |
|---|---|---|---|
| 5,058,436 A * | 10/1991 | Bellec et al. | 73/727 |
| 5,495,768 A | 3/1996 | Louwagie | |
| 6,820,490 B2 * | 11/2004 | Mittelstein et al. | 73/715 |
| 7,275,443 B2 * | 10/2007 | Dannhauer et al. | 73/716 |
| 7,293,464 B1 * | 11/2007 | Juan | 73/754 |
| 7,461,557 B1 * | 12/2008 | Burczyk et al. | 73/706 |

FOREIGN PATENT DOCUMENTS

| | | |
|---|---|---|
| DE | 100 31 120 A1 | 1/2002 |
| DE | 100 36 433 A1 | 2/2002 |
| DE | 101 31 688 A1 | 7/2002 |
| DE | 101 52 681 A1 | 4/2003 |
| DE | 101 62 681 A1 | 4/2003 |
| DE | 101 62 044 A1 | 6/2003 |
| EP | 0 757 237 B1 | 2/1997 |
| EP | 1 114 987 A2 | 7/2001 |

* cited by examiner

HYDRAULIC PRESSURE INTERMEDIARY

TECHNICAL FIELD

The present invention relates to a hydraulic pressure intermediary, also referred to as a diaphragm seal, or chemical seal.

BACKGROUND DISCUSSION

The pressure intermediary of the invention includes: A platform, with a membrane- or diaphragm-bed on a surface of the platform; a separating membrane, or diaphragm, which is secured to the platform in its edge region to enclose a cavity; and a hydraulic path, which communicates with the cavity through an opening in the surface of the platform; wherein the cavity and the hydraulic path are filled with a pressure-transfer liquid.

Pressure intermediaries of this type are basically known, and the state of the art includes a multitude of embodiments of separating membranes, which are optimized for the most varied of conditions.

For example, DE 100 31 120 A1 discloses a pressure intermediary proposed for minimizing or eliminating a temperature-dependent membrane error. This temperature-dependent error stems from elastic deformation of the separating membrane due to pressure in the pressure-transfer liquid resulting from the temperature-dependent volume change of the pressure-transfer liquid. DE 100 31 120 A1 discloses, for example, a pressure intermediary having a bowl-shaped separating membrane, which has a flat edge region for attachment of the separating membrane to a platform and a lightly waved, central region depressed relative to the edge region. Extending between the edge region and the central region is an inclined transition region connecting the edge and central regions together. The separating membrane and the platform are matched to one another in such a manner that the equilibrium position of the separating membrane changes as a function of temperature, and, in fact, in such a manner that the resulting volume in the cavity between the separating membrane and the platform corresponds to the temperature-dependent volume of the pressure-transfer liquid. This is achieved by, among other things, providing the platform with a greater coefficient of thermal expansion than the separating membrane. Although the described state of the art according to DE 100 31 120 A1 might be of interest for thermal equilibrium situations, nevertheless in the case of temperature differences between the platform and the separating membrane, which can arise, for example, following CIP cleanings with hot steam and subsequent filling with cold media, large stresses can be experienced in the membrane, which effect a permanent zero-point shift and thus a measurement error. This is attributable not the least to the fact that the transition region effects a relatively stiffer coupling between edge region and central region. The coupling should determine the particular temperature-dependent equilibrium position of the separating membrane.

The problem of CIP cleaning of membranes and the resulting hysteresis is discussed in U.S. Pat. No. 5,495,768. According to this, due to the momentum of the incoming cleaning medium, the pressure-transfer liquid is shifted under the separating membrane and this leads to a bulging of the planar membrane and permanent deformation of the joint between the membrane and the platform. It is doubtful whether this description of the causes of the permanent deformation is actually appropriate or complete, because temperature gradients are not sufficiently taken into consideration. In any event, this patent discloses, as its proposed solution, a pressure intermediary with a bowl-shaped separating membrane, which has a flat edge region for attachment of the separating membrane to a platform and a lightly waved, central region depressed relative to the edge region. Extending between the edge region and the central region is an inclined transition region, which connects the edge region and the central region together. The platform has a mainly congruent surface, and, thus also, a flat, annular edge region, a deeper, lightly waved, central region and an inclined annular transition region lying between the edge region and the central region. The edge region of the separating membrane is flushly connected by means of solder with the edge region of the surface of the platform. For unloading the edge region, the transition region is very stiff. I.e., in the case of a deflection of the separating membrane for accommodating a shifted oil volume, the transition region and the edge region protected by such are scarcely deflected. The deformation occurs exclusively in the central region of the separating membrane.

It need not be answered, whether the described approach achieves the desired unloading of the joint. To accommodate the oil volumes, there are required, in such case, nevertheless, such deflections of the separating membrane that a plastic deformation and, therewith, a zero-point shift can occur. The required large deflections in the central region come, not lastly, from the stiffness of the transition region, which limit a deflection of the volume-efficient zones of the central region, thus the annular zones with large radii.

SUMMARY OF THE INVENTION

An object of the present invention, therefore, is to provide a pressure intermediary overcoming the disadvantages of the described state of the art.

The object is achieved according to the invention by a pressure intermediary which includes:

a platform, which has an essentially axi-symmetric, bowl-shaped surface having a flat, annular, platform-surface edge region, a platform-surface central region depressed relative to the platform-surface edge region and surrounded by the platform-surface edge region, and an annular platform-surface transition region, which borders, on its inner side, the platform-surface central region and, on its outer side, the platform-surface edge region;

an essentially axi-symmetric, bowl-shaped, separating membrane having a flat, annular, separating-membrane edge region, a separating-membrane central region depressed relative to the separating-membrane edge region and an annular separating-membrane transition region, which borders, on its inner side, the separating-membrane central region and, on its outer side, the separating-membrane edge region;

wherein the separating membrane is connected with the platform-surface edge region within the separating-membrane edge region along a surrounding joint, in order to enclose a cavity which is filled with a pressure-transfer liquid, wherein the cavity communicates with a hydraulic path through an opening in the surface of the platform; wherein, further, the separating-membrane transition region includes an annular moat having a moat outer side, a moat inner side, and a moat transition zone, wherein the moat outer side has a first annular inclined surface, which borders on the separating-membrane edge region, the moat inner side includes a second annular inclined surface, which borders on the separating-membrane central region, and a moat transition zone extends between the first and the second inclined surfaces.

The first inclined surface has, preferably, relative to a plane perpendicular to the axis of symmetry of the separating membrane, a maximum inclination of at least 15°, further preferably at least 20° and especially preferably at least 25°. The second inclined surface has, preferably, relative to a plane perpendicular to the axis of symmetry of the separating membrane, a maximum inclination of at least 20°, further preferably at least 25° and especially preferably at least 30°.

The angle between the maximum inclination of the first inclined surface and the maximum inclination of the second inclined surface, as measured in a plane along the axis of symmetry of the separating membrane, amounts preferably to at least 35°, further preferably to at least 45°, and especially preferably to at least 55°.

The inclination of the first inclined surface is preferably greater than, especially at least 5° greater than, and especially preferably at least 10° greater than, the inclination of the second inclined surface.

The separating-membrane central region can have annular waves with an amplitude in the axial direction of, for example, about 0.08 mm to 0.25 mm. The radial separation between the maxima of neighboring waves amounts, preferably, to not less than 1.75 mm, further preferably not less than 2.25 mm, and especially preferably not less than 2.75 mm. The radial separation between the maxima of neighboring waves amounts preferably to not more than 5 mm, further preferably not more than 4 mm, and especially preferably not more than 3.5 mm. In a currently preferred embodiment, the radial separation amounts to about 3 mm.

The depth of the separating-membrane central region relative to the separating-membrane edge region amounts, preferably, to not less than 0.175 mm, further preferably not less than 0.225 mm, and especially preferably not less than 0.275 mm. The depth of the separating-membrane central region relative to the separating-membrane edge region amounts, preferably, to not more than 0.6 mm, further preferably not more than 0.45 mm, and especially preferably not more than 0.35 mm. The depth of the separating-membrane central region relative to the separating-membrane edge region amounts, in a currently preferred embodiment, to about 0.3 mm.

The depth of the minimum of the moat transition zone relative to the separating-membrane central region amounts, preferably, to not less than 0.25 mm, further preferably not less than 0.35 mm and especially preferably not less than 0.45 mm. The depth of the minimum of the moat transition zone relative to the separating-membrane central region amounts, preferably, to not more than 0.75 mm, further preferably not more than 0.65 mm and especially preferably not more than 0.55 mm. In a currently preferred embodiment of the invention, the depth of the minimum of the moat transition zone amounts to about 0.5 mm.

In a further embodiment of the invention, the bowl-shaped surface of the platform has a membrane bed with a contour, against which the separating membrane is pressed to form the separating membrane. The separating a membrane can thus have a membrane contour, which is essentially predetermined by the contour of the membrane bed and corresponds in large part thereto. Due to the elastic spring back of the separating membrane after the pressing and/or the stiffness of the separating membrane material, the amplitudes of the contour of the separating membrane can in some regions be possibly smaller than the amplitudes of the contour of the membrane bed in the corresponding regions.

The hydraulic pressure intermediary of the invention according to the further embodiment includes:

a platform, which has an essentially axi-symmetric, bowl-shaped surface having a flat, annular, platform-surface edge region, a platform-surface central region depressed relative to the platform-surface edge region and surrounded by the platform-surface edge region, and an annular platform-surface transition region, which borders, on its inner side, the platform-surface central region and, on its outer side, the platform-surface edge region;

an essentially axi-symmetric, bowl-shaped, separating membrane having a flat, annular, separating-membrane edge region, a separating-membrane central region depressed relative to the separating-membrane edge region and an annular separating-membrane transition region, which borders, on its inner side, the separating-membrane central region and, on its outer side, the separating-membrane edge region;

wherein the separating membrane is connected with the platform-surface edge region in the separating-membrane edge region along a surrounding joint, in order to enclose a cavity which is filled with a pressure-transfer liquid, wherein the cavity communicates with a hydraulic path through an opening in the surface of the platform; and the separating membrane has been formed by pressing it against the bowl-shaped surface of the platform; wherein further the platform-surface transition region includes an annular depression having a depression outer side, a depression inner side and a depression transition zone, wherein the depression outer side has a first annular, inclined surface, which borders on the platform-surface edge region, the depression inner side includes a second annular, inclined surface, which borders on the platform-surface central region, and a depression transition zone extends between the first and the second inclined surfaces.

The first inclined surface has, preferably, relative to a plane perpendicular to the axis of symmetry of the bowl-shaped surface, a maximum inclination of at least 15°, further preferably at least 20°, and especially preferably at least 25°. The second inclined surface has, preferably, relative to a plane perpendicular to the axis of symmetry of the bowl-shaped surface, a maximum inclination of at least 20°, further preferably at least 25° and especially preferably at least 30°.

The angle between the maximum inclination of the first inclined surface and the maximum inclination of the second inclined surface measured in a plane along the axis of symmetry of the bowl-shaped surface amounts preferably to at least 35°, further preferably at least 45° and especially preferably at least 55°.

The inclination of the first inclined surface is advantageously greater than, preferably at least 5° greater than, and especially preferably at least 10° greater than the inclination of the second inclined surface.

The platform-surface central region can include annular waves having an amplitude in the axial direction of, for example, 0.08 mm to 0.25 mm. The radial separation between maxima of neighboring waves amounts preferably to not less than 1.75 mm, further preferably not less than 2.25 mm, and especially preferably not less than 2.75 mm. The radial separation between maxima of neighboring waves amounts preferably to not more than 5 mm, further preferably to not more than 4 mm, and especially preferably to not more than 3 mm.

The depth of the platform-surface central region relative to the platform-surface edge region amounts, preferably, to not less than 0.175 mm, further preferably to not less than 0.225 mm, and especially preferably to not less than 0.275 mm. The depth of the platform-surface central region relative to the platform-surface edge region amounts, preferably, to not more than 0.6 mm, further preferably to not more than 0.45 mm, and especially preferably to not more than 0.35 mm. The depth of the platform-service central region relative to the platform-service edge region amounts, in a currently preferred embodiment, to about 0.3 mm.

The depth of the minimum of the depression transition zone relative to the separating-membrane central region amounts preferably to not less than 0.25 mm, further preferably to not less than 0.35 mm and especially preferably to not less than 0.45 mm. The depth of the minimum of the depression transition zone relative to the separating-membrane central region amounts preferably to not more than 0.75 mm, further preferably to not more than 0.65 mm and especially preferably to not more than 0.55 mm. In a currently preferred embodiment of the invention, the depth of the minimum of the depression transition zone amounts to about 0.5 mm.

The platform is composed preferably of a metal material, for example stainless steel, Inconel, Hastelloy, other alloys or aluminum. The separating membrane is composed preferably likewise of a metal material, for example, stainless steel, Inconel, Hastelloy, other alloys or tantalum.

The invention will now be explained on the basis of an example of an embodiment presented in the drawings, the figures of which show as follows:

The invention will now be explained on the basis of an example of an embodiment presented in the drawings, the figures of which show as follows:

DETAILED DISCUSSION OF THE DRAWINGS

Figure 1:
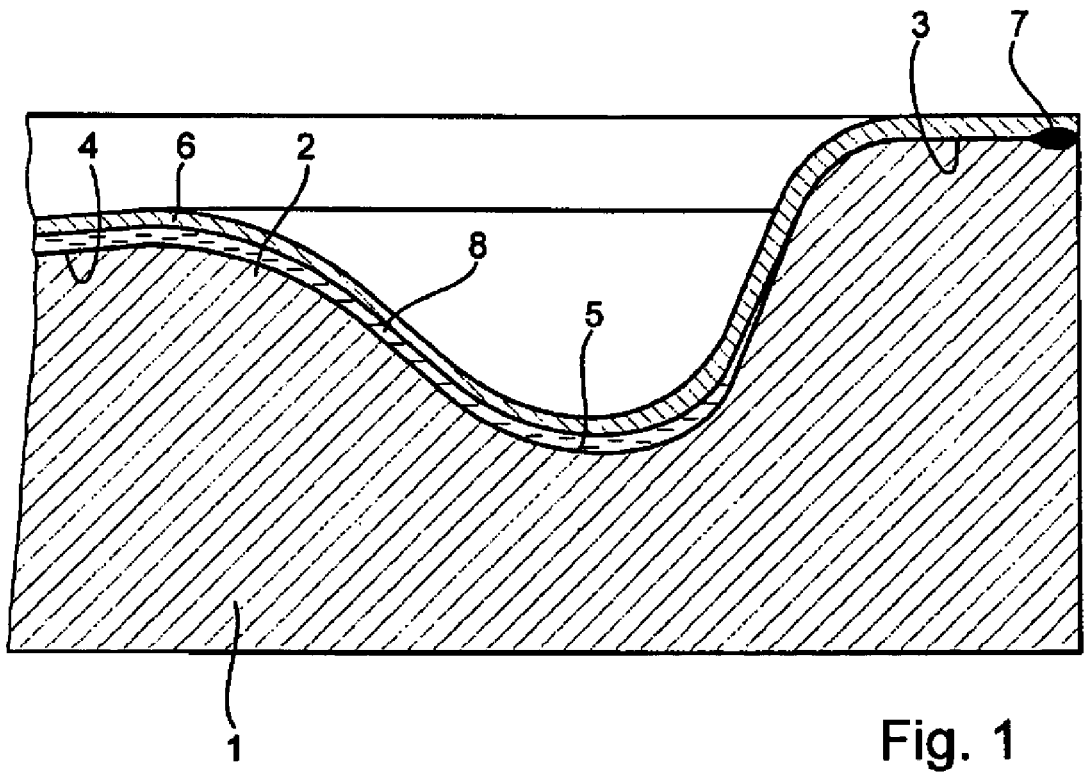
FIG. 1 is a schematic, longitudinal section through the edge region of a pressure intermediary of the invention.

The hydraulic pressure intermediary shown in FIG. 1 includes a platform 1, which has an essentially axi-symmetric, bowl-shaped surface 2, with a flat, annular, platform-surface edge region 3 and a platform-surface central region 4 depressed relative to the platform-surface edge region 3 and surrounded by the platform-surface edge region 3. Further shown is an annular platform-surface transition region 5, which borders, on its inner side, on the platform-surface central region 4 and, on its outer side, on the platform-surface edge region 3. The platform-surface transition region is embodied axi-symmetrically in this example of an embodiment and, indeed, in such a manner that the fall of the platform-surface edge region to the platform-surface transition region is steeper than the rise of the platform-surface transition region to the platform-surface central region.

The pressure intermediary further includes a bowl-shaped separating-membrane 6, which is connected with the platform-surface edge region 3 along a surrounding weld-seam 7 or solder connection. Separating-membrane 6 is formed by pressing it against the bowl-shaped platform surface.

Formed between the separating membrane 6 and the surface 2 of the platform 1 is a cavity 8, which is filled with a pressure-transfer liquid. The cavity serves as a pressure chamber and communicates via an opening (not shown) in the surface of the platform with a hydraulic path, in order to transfer the pressure on the separating-membrane 2 to a pressure measuring cell.

Figure 2:
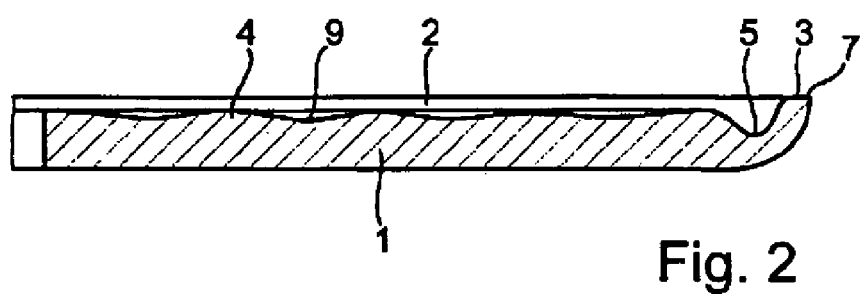
FIG. 2 is a detail view of a longitudinal section through the membrane bed of a pressure intermediary of the invention.

On the left side of FIG. 1, a radially inwardly located region of the pressure intermediary has been cut away. In this region, a membrane bed and the separating membrane conformed thereto exhibit an annular wave pattern. The size relationships between this wave pattern 9 and the platform-surface transition region are better shown in FIG. 2. As shown, the annular, concentric waves and the platform-surface central region have essentially flatter contours than the platform-surface transition region at the edge. In the example of an embodiment, the axial distance between wave and valleys and waves peaks amounts to about 0.14 mm in the case of a radial separation of more than 3 mm between neighboring wave peaks. The selected wave contour enables sufficient volume stroke of the separating membrane, without overly stiffening such.

Comparative testing of the pressure intermediary of the invention and pressure intermediaries of the state of the art was conducted. The separating membranes of the pressure intermediaries of the state of the art had no moat. The pressure intermediaries were subjected to multiple temperature shocks. The pressure intermediaries of the state of the art exhibited thereafter a zero-point shift of about 1.2 mbar, while the pressure intermediary of the invention showed a zero-point shift lying between 0.2 and 0.4 mbar. The zero-point shift tendency in the case of pressure intermediaries of the invention with an asymmetric transition zone was toward smaller numbers as compared with the pressure intermediaries of the invention with a symmetric transition zone.

The ivention claimed is:

1. A hydraulic pressure intermediary, comprising:
a platform, which has an essentially axi-symmetric, bowl-shaped surface having a flat, annular, platform-surface edge region, a platform-surface central region depressed relative to the platform-surface edge region and surrounded by the platform-surface edge region, and an annular platform-surface transition region, which borders, on its inner side, the platform-surface central region and, on its outer side, the platform-surface edge region; and
an essentially axi-symmetric, bowl-shaped, separating membrane having a flat, annular, separating-membrane edge region, a separating-membrane central region depressed relative to the separating-membrane edge region and an annular separating-membrane transition region, which borders, on its inner side, the separating-membrane central region and, on its outer side, the separating-membrane edge region, wherein:
said separating membrane is connected with said platform-surface edge region within said separating-membrane edge region along a surrounding joint, in order to enclose a cavity filled with a pressure-transfer liquid, wherein the cavity communicates with a hydraulic path through an opening in the surface of said platform;
said separating-membrane transition region includes an annular moat having a moat outer side, a moat inner side, and a moat transition zone, wherein said moat outer side has a first annular, inclined surface, which borders on said separating-membrane edge region, said moat inner side includes a second annular, inclined surface, which borders on said separating-membrane central region, and said moat transition zone extends between the first and the second inclined surfaces.

2. The hydraulic pressure intermediary as claimed in claim 1, wherein:
said first inclined surface has, relative to a plane perpendicular to the axis of symmetry of said separating membrane, a maximum inclination of at least 15°, preferably at least 20°, and especially preferably at least 25°.

3. The hydraulic pressure intermediary as claimed in claim 1, wherein:
said second inclined surface has, relative to a plane perpendicular to the axis of symmetry of said separating membrane, a maximum inclination of at least 20°, preferably at least 25°, and especially preferably at least 30°.

4. The hydraulic pressure intermediary as claimed in claim 1, wherein:
the angle between the maximum inclination of said first inclined surface and the maximum inclination of said second inclined surface, as measured in a plane along the axis of symmetry of said separating membrane, amounts to at least 35°, preferably at least 45°, and especially preferably at least 55°.

5. The hydraulic pressure intermediary as claimed in claim 1, wherein:
the inclination of said first inclined surface is greater than, preferably at least 5° greater than, and especially preferably at least 10° greater than, the inclination of said second inclined surface.

6. The hydraulic pressure intermediary as claimed in claim 1, wherein:
said separating-membrane central region has annular waves.

7. The hydraulic pressure intermediary as claimed in claim 6, wherein:
axially-directed amplitude of said annular waves amounts to about 0.08 mm to 0.25 mm.

8. The hydraulic pressure intermediary as claimed in claim 6, wherein:
radial separation between maxima of neighboring waves amounts to not less than 1.75 mm, preferably not less than 2.25 mm, and especially preferably not less than 2.75 mm.

9. The hydraulic pressure intermediary as claimed in claim 6, wherein:
the radial separation between the maxima of neighboring waves amounts to not more than 5 mm, preferably not more than 4 mm, and especially preferably not more than 3.5 mm.

10. The hydraulic pressure intermediary as claimed in claim 1, wherein:
the depth of said separating-membrane central region relative to said separating-membrane edge region amounts to not less than 0.175 mm, preferably not less than 0.225 mm, and especially preferably not less than 0.275 mm.

11. The hydraulic pressure intermediary as claimed in claim 1, wherein:
the depth of said separating-membrane central region relative to said separating-membrane edge region amounts to not more than 0.6 mm, preferably not more than 0.45 mm, and especially preferably not more than 0.35 mm.

12. The hydraulic pressure intermediary as claimed in claim 1, wherein:
the minimum depth of said moat transition zone relative to said separating-membrane central region amounts to not less than 0.25 mm, preferably not less than 0.35 mm and especially preferably not less than 0.45 mm.

13. The hydraulic pressure intermediary as claimed in claim 1, wherein:
the minimum depth of said moat transition zone relative to said separating-membrane central region amounts to not more than 0.75 mm, preferably not more than 0.65 mm and especially preferably not more than 0.55 mm.

14. A hydraulic pressure intermediary, comprising:
a platform, which has an essentially axi-symmetric, bowl-shaped surface having a flat, annular, platform-surface edge region, a platform-surface central region depressed relative to the platform-surface edge region and surrounded by the platform-surface edge region, and an annular platform-surface transition region, which borders, on its inner side, the platform-surface central region and, on its outer side, the platform-surface edge region; and
an essentially axi-symmetric, bowl-shaped, separating membrane having a flat, annular, separating-membrane edge region, a separating-membrane central region depressed relative to the separating-membrane edge region, and an annular separating-membrane transition region, which borders, on its inner side, the separating-membrane central region and, on its outer side, the separating-membrane edge region, wherein:
said separating membrane is connected with said platform-surface edge region in said separating-membrane edge region along a surrounding joint, in order to enclose a cavity which is filled with a pressure-transfer liquid, wherein the cavity communicates with a hydraulic path through an opening in the surface of said platform;
said separating membrane has been formed by pressing it against the bowl-shaped surface of said platform; and
said platform-surface transition region includes an annular depression having a depression outer side, a depression inner side and a depression transition zone, wherein said depression outer side has a first annular, inclined surface, which borders on said platform-surface edge region, said depression inner side includes a second annular, inclined surface, which borders on said platform-surface central region, and said depression transition zone extends between said first and said second inclined surfaces.

15. The hydraulic pressure intermediary as claimed in claim 14, wherein:
said first inclined surface has, relative to a plane perpendicular to the axis of symmetry of said bowl-shaped surface, a maximum inclination of at least 15°, preferably at least 20°, and especially preferably at least 25°.

16. The hydraulic pressure intermediary as claimed in claim 14, wherein:
said second inclined surface has, relative to a plane perpendicular to the axis of symmetry of said bowl-shaped surface, a maximum inclination of at least 20°, preferably at least 25°, and especially preferably at least 30°.

17. The hydraulic pressure intermediary as claimed in claim 14, wherein:
the angle between the maximum inclination of said first inclined surface and the maximum inclination of said second inclined surface, as measured in a plane along the axis of symmetry of said bowl-shaped surface, amounts to at least 35°, preferably at least 45°, and especially preferably at least 55°.

18. The hydraulic pressure intermediary as claimed in claim 14, wherein:
the inclination of said first inclined surface is greater than, preferably at least 5° greater than, and especially preferably at least 10° greater than the inclination of said second inclined surface.

19. The hydraulic pressure intermediary as claimed in claim 14, wherein:
said platform-surface central region has annular waves.

20. The hydraulic pressure intermediary as claimed in claim 14, wherein:
said platform comprises a metal material, for example stainless steel, Inconel, Hastelloy, other alloys or aluminum.

21. The hydraulic pressure intermediary as claimed in claim 14, wherein:
said separating membrane comprises a metal material, for example, stainless steel, Inconel, Hastelloy, other alloys or tantalum.

* * * * *